(12) United States Patent
Tyan et al.

(10) Patent No.: US 11,176,680 B2
(45) Date of Patent: Nov. 16, 2021

(54) METHOD OF TRACKING OBJECT AND APPARATUSES PERFORMING THE SAME

(71) Applicant: KONKUK UNIVERSITY INDUSTRIAL COOPERATION CORP, Seoul (KR)

(72) Inventors: Vladimir Tyan, Seoul (KR); Doo Hyun Kim, Gyeonggi-do (KR)

(73) Assignee: KONKUK UNIVERSITY INDUSTRIAL COOPERATION CORP

( * ) Notice: Subject to any disclaimer, the term of this patent is extended or adjusted under 35 U.S.C. 154(b) by 0 days.

(21) Appl. No.: 16/069,842

(22) PCT Filed: Dec. 22, 2017

(86) PCT No.: PCT/KR2017/015350
§ 371 (c)(1),
(2) Date: Jul. 12, 2018

(87) PCT Pub. No.: WO2019/124602
PCT Pub. Date: Jun. 27, 2019

(65) Prior Publication Data
US 2021/0217181 A1 Jul. 15, 2021

(30) Foreign Application Priority Data
Dec. 21, 2017 (KR) .................. 10-2017-0177521

(51) Int. Cl.
*G06T 7/20* (2017.01)
*G06F 17/18* (2006.01)
(Continued)

(52) U.S. Cl.
CPC ............ *G06T 7/20* (2013.01); *G06F 17/18* (2013.01); *G06K 9/6215* (2013.01); *G06N 3/08* (2013.01);
(Continued)

(58) Field of Classification Search
None
See application file for complete search history.

(56) References Cited

U.S. PATENT DOCUMENTS

| 8,891,821 B2 | 11/2014 | Sato | ............ G06T 7/208 |
| 2012/0093364 A1* | 4/2012 | Sato | ............ G06T 7/277 |
| | | | 382/103 |

(Continued)

FOREIGN PATENT DOCUMENTS

| JP | 2011170684 | 9/2011 | ............ G06T 7/00 |
| JP | 2011243229 | 12/2011 | ............ G06T 7/20 |

(Continued)

OTHER PUBLICATIONS

International Search Report and Written Opinion (w/machine translation) issued in application No. PCT/KR2017/015350, dated Sep. 19, 2018 (15 pgs).

(Continued)

*Primary Examiner* — Vikkram Bali
(74) *Attorney, Agent, or Firm* — Hayes Soloway P.C.

(57) ABSTRACT

Disclosed is a method of tracking an object and apparatuses performing the same, the method including generating a plurality of candidate particles corresponding to an object in a video frame to track the object, and tracking the object by generating optimal particles corresponding to a position of the object in the video frame based on similarities of the plurality of candidate particles with respect to the object.

16 Claims, 6 Drawing Sheets

(51) Int. Cl.
G06K 9/62 (2006.01)
G06N 3/08 (2006.01)
(52) U.S. Cl.
CPC ............... *G06T 2207/10016* (2013.01); *G06T 2207/20076* (2013.01)

(56) References Cited

U.S. PATENT DOCUMENTS

| | | | |
|---|---|---|---|
| 2016/0092736 A1* | 3/2016 | Mai | G06K 9/4604 382/103 |
| 2017/0148430 A1 | 5/2017 | Lee | G10L 15/063 |
| 2017/0169313 A1* | 6/2017 | Choi | G06K 9/4628 |
| 2019/0034734 A1* | 1/2019 | Yen | G06T 7/246 |
| 2019/0096086 A1* | 3/2019 | Xu | G06K 9/00791 |

FOREIGN PATENT DOCUMENTS

| | | | | |
|---|---|---|---|---|
| JP | 2012234466 | 11/2012 | ............... | G06T 7/00 |
| KR | 20150081797 | 7/2015 | ............... | G06T 7/00 |
| KR | 101735365 | 5/2017 | ............... | G06T 7/11 |
| KR | 20170061016 | 6/2017 | ............... | G06K 9/62 |
| KR | 20170062290 | 6/2017 | ............... | G06K 9/00 |
| KR | 20170070715 | 6/2017 | ............... | G06N 3/08 |

OTHER PUBLICATIONS

Korean Office Action (no translation available) issued in application No. 10-2017-0177521, dated Oct. 18, 2018 (5 pgs).

* cited by examiner

10

200

230

METHOD OF TRACKING OBJECT AND APPARATUSES PERFORMING THE SAME

TECHNICAL FIELD

Embodiments relate to a method of tracking an object and apparatuses performing the same.

BACKGROUND ART

An object tracking algorithm tracks an object through template matching. For example, scanning window estimates candidates near a target position in a previous frame by directly comparing a target patch of the previous frame with a candidate patch in a current frame.

Deep learning, for example, a convolutional neural network (CNN), has attracted attention in the last few years.

For example, the CNN has been successfully applied to various fields of computer vision such as image classification, semantic segmentation, object detection and human pose estimation.

Recently, a distinguishing function of the CNN has been used for visual object tracking.

DISCLOSURE OF INVENTION

Technical Goals

An aspect provides technology with excellent object tracking accuracy and speed performance, by tracking an object in a video frame using a particle filter and a pre-trained convolutional neural network (CNN) model.

Technical Solutions

According to an aspect, there is provided an object tracking method including generating a plurality of candidate particles corresponding to an object in a video frame to track the object, and tracking the object by generating optimal particles corresponding to a position of the object in the video frame based on similarities of the plurality of candidate particles with respect to the object.

The generating may include generating a plurality of initial particles corresponding to the object based on the video frame, and generating the plurality of candidate particles by predicting motions of the plurality of initial particles through at least one of drift and diffuse of the plurality of initial particles.

The drift may be performed by varying a motion vector component for the plurality of initial particles.

The diffuse may be performed by varying coordinates of a bounding box for the plurality of initial particles.

The generating of the plurality of initial particles may include generating the plurality of initial particles initialized with random values using the Gaussian distribution, in a case in which the video frame is an initial video frame.

The generating of the plurality of initial particles may include generating the plurality of initial particles by resampling a plurality of candidate particles corresponding to an object in a previous video frame of the video frame, in a case in which the video frame is not an initial video frame.

The generating of the plurality of initial particles by resampling the plurality of candidate particles corresponding to the object in the previous video frame of the video frame may include removing at least one candidate particle with a relatively low weight from the plurality of candidate particles corresponding to the object in the previous video frame, generating a plurality of replacement particles corresponding to the object in the video frame initialized with random values based on a number of the at least one candidate particle, and determining a plurality of unremoved candidate particles of the previous video frame and the plurality of replacement particles to be the plurality of initial particles.

The tracking may include calculating the similarities of the plurality of candidate particles with respect to the object using a pre-trained convolutional neural network (CNN) model, determining weights of the plurality of candidate particles based on the similarities; and tracking the object by generating the optimal particles at a mean position of candidate particles with relatively high weights among the plurality of candidate particles.

The pre-trained CNN model may be trained using at least one of training through a video dataset and training through a most recently tracked video frame.

The training through the video dataset may be training through a positive patch with respect to an object in the video dataset and a negative patch with respect to a background in the video dataset.

The training through the most recently tracked video frame may be training through a positive patch with respect to an object in the most recently tracked video frame and a negative patch with respect to a background in the most recently tracked video frame.

The tracking may further include updating the pre-trained CNN model through the tracked object.

According to an aspect, there is provided an object tracking apparatus including a communication module configured to receive a video frame, and a controller configured to generate a plurality of candidate particles corresponding to an object in a video frame to track the object, and track the object by generating optimal particles corresponding to a position of the object in the video frame based on similarities of the plurality of candidate particles with respect to the object.

The controller may include a particle filter configured to generate a plurality of initial particles corresponding to the object based on the video frame, and generate the plurality of candidate particles by predicting motions of the plurality of initial particles through at least one of drift and diffuse of the plurality of initial particles.

The drift may be performed by varying a motion vector component for the plurality of initial particles.

The diffuse may be performed by varying coordinates of a bounding box for the plurality of initial particles.

The particle filter may be configured to generate the plurality of initial particles initialized with random values using the Gaussian distribution, in a case in which the video frame is an initial video frame.

The particle filter may be configured to generate the plurality of initial particles by resampling a plurality of candidate particles corresponding to an object in a previous video frame of the video frame, in a case in which the video frame is not an initial video frame.

The particle filter may be configured to remove at least one candidate particle with a relatively low weight from the plurality of candidate particles corresponding to the object in the previous video frame, generate a plurality of replacement particles corresponding to the object in the video frame initialized with random values based on a number of the at least one candidate particle, and determine a plurality of unremoved candidate particles of the previous video frame and the plurality of replacement particles to be the plurality of initial particles.

The controller may include a tracker configured to calculate the similarities of the plurality of candidate particles with respect to the object using a pre-trained CNN model, determine weights of the plurality of candidate particles based on the similarities, and track the object by generating the optimal particles at a mean position of candidate particles with relatively high weights among the plurality of candidate particles.

The pre-trained CNN model may be trained using at least one of training through a video dataset and training through a most recently tracked video frame.

The training through the video dataset may be training through a positive patch with respect to an object in the video dataset and a negative patch with respect to a background in the video dataset.

The training through the most recently tracked video frame may be training through a positive patch with respect to an object in the most recently tracked video frame and a negative patch with respect to a background in the most recently tracked video frame.

The tracker may be configured to update the pre-trained CNN model through the tracked object.

BEST MODE FOR CARRYING OUT THE INVENTION

Figure 1:
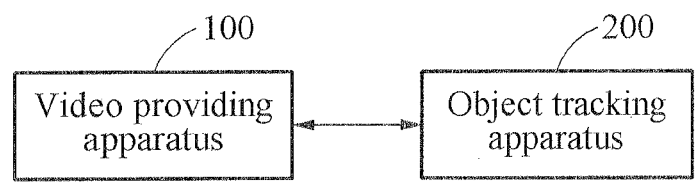
FIG. 1 is a block diagram illustrating an object tracking system according to an embodiment.

The following structural or functional descriptions are exemplary to merely describe the embodiments, and the scope of the embodiments is not limited to the descriptions provided herein.

Various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The term "module" may be hardware configured to perform a function and an operation for each element described herein, a computer program code configured to perform a specific function and operation, or an electronic recording medium, for example, a processor or a microprocessor, including the computer program code configured to perform the specific function and operation.

That is, the module may indicate a functional and/or structural combination of hardware configured to perform the technical idea of the present disclosure and/or software configured to drive the hardware.

Hereinafter, the embodiments will be described in detail with reference to the accompanying drawings. However, the scope of the present application is not limited to the embodiments. In the drawings, like reference numerals are used for like elements.

FIG. 1 is a block diagram illustrating an object tracking system according to an embodiment.

Referring to FIG. 1, an object tracking system 10 may include a video providing apparatus 100 and an object tracking apparatus 200.

The video providing apparatus 100 may shoot and store a video. For example, the video providing apparatus 100 may shoot the video through a camera (not shown) of the video providing apparatus 100, and store (or record) the shot video in a memory (not shown) of the video providing apparatus 100. In this example, the video may be a video stream including a plurality of video frames.

The video providing apparatus 100 may provide the video to the object tracking apparatus 200 by communicating with the object tracking apparatus 200. For example, the video providing apparatus 100 may provide the video to the object tracking apparatus 200 by communicating with the object tracking apparatus 200 based on various communications using Internet communication network, the intranet, local area network (LAN), wireless LAN, Wi-Fi, LF, Xbee, Zigbee, Blue-Tooth and Beacon.

Although the video providing apparatus 100 provides the video to the object tracking apparatus 200 as described above, embodiments are not limited thereto. For example, software and various apparatuses such as CCTV and the Internet may provide the video to the object tracking apparatus 200.

The object tracking apparatus 200 may track an object in a video frame by generating optimal particles corresponding to a position of the object in the video frame using a particle filter and a pre-trained convolutional neural network (CNN) model.

That is, the object tracking apparatus 200 may track the object in the video frame using the particle filter and the pre-trained CNN model, thereby providing technology with excellent object tracking accuracy and speed performance.

Figure 2:
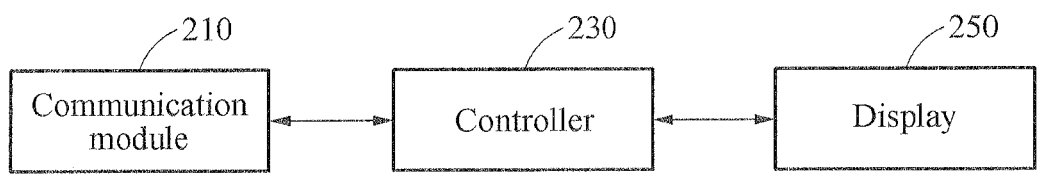
FIG. 2 is a block diagram illustrating an object tracking apparatus of FIG. 1.
Figure 3:
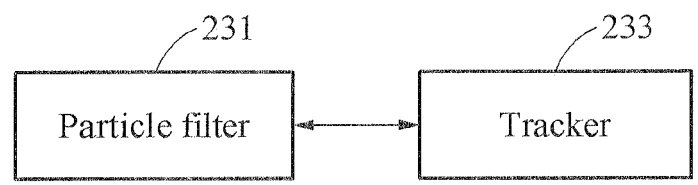
FIG. 3 is a block diagram illustrating a controller of FIG. 2.
Figure 4:
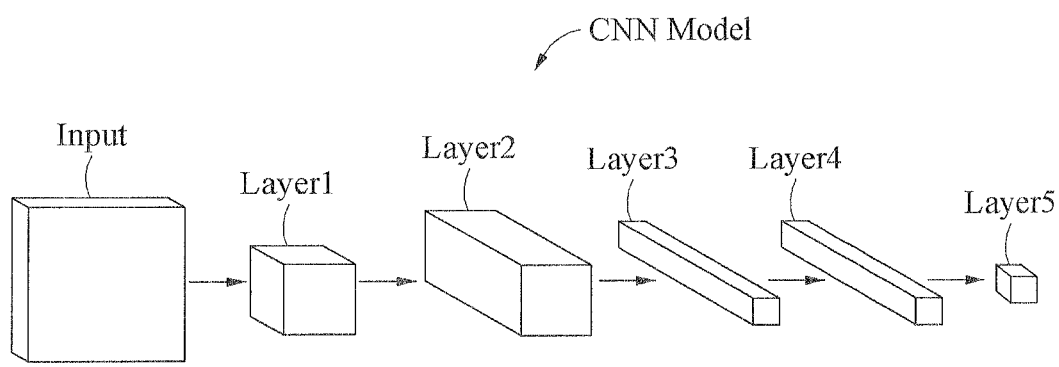
FIG. 4 illustrates an example of a convolutional neural network (CNN) model according to an embodiment.
Figure 5:
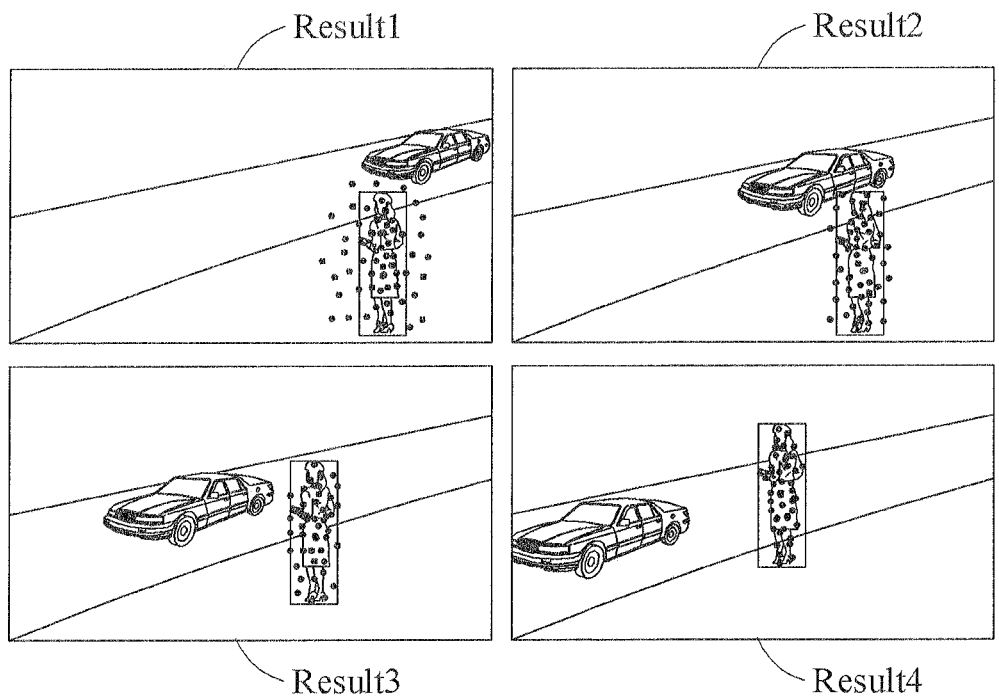
FIG. 5 illustrates an example of an object marked with a bounding box according to an embodiment.

FIG. 2 is a block diagram illustrating an object tracking apparatus of FIG. 1, FIG. 3 is a block diagram illustrating a controller of FIG. 2, FIG. 4 illustrates an example of a CNN model according to an embodiment, and FIG. 5 illustrates an example of an object marked with a bounding box according to an embodiment.

Referring to FIG. 2, the object tracking apparatus 200 may include a communication module 210, a controller 230 and a display 250.

The communication module 210 may receive a video and transmit the received video to the controller 230. For example, the communication module 210 may receive the video from the video providing apparatus 100, and sequentially transmit a plurality of video frames included in the video to the controller 230.

The controller 230 may control an overall operation of the object tracking apparatus 200. For example, the controller 230 may control an operation of each of the elements 210 and 250.

The controller 230 may generate a plurality of candidate particles corresponding to the object in the video frame to track the object in the video frame.

For example, the plurality of candidate particles corresponding to the object in the video frame may be generated in a vicinity of the object in the video frame.

In a case in which the video frame is an initial video frame, the object in the video frame may be recognized by being marked and set in advance with a bounding box. The plurality of candidate particles may be marked with the bounding box. The bounding box may be a box to distinguish the object in the video frame and a background in the video frame.

The controller 230 may track the object in the video frame by generating optimal particles corresponding to a position of the object in the video frame based on similarities of the plurality of candidate particles with respect to the object in the video frame. The optimal particles may be marked with the bounding box.

The controller 230 may include a particle filter 231 and a tracker 233 as shown in FIG. 3.

The particle filter 231 may generate a plurality of initial particles corresponding to the object in the video frame based on the video frame. For example, the particle filter 231 may be a sequential Monte Carlo filter. The plurality of initial particles may be generated using a state model. The plurality of initial particles may be marked with a bounding box.

The state model may be expressed by Equation 1.

$$[x; y; \bar{x}; \bar{y}; w; h]$$ [Equation 1]

In Equation 1, [x;y] denotes coordinates of the bounding box, [x̄; ȳ] denotes motion vector components, [w;h] denotes a size of the bounding box, w denotes a width, and h denotes a height.

In a case in which the video frame is the initial video frame, the particle filter 231 may generate the plurality of initial particles initialized with random values using the Gaussian distribution.

In detail, the particle filter 231 may generate 1000 or more initial particles initialized with the random values using the Gaussian distribution. In this example, the Gaussian distribution may be a Gaussian distribution vector of a standard deviation. A number of the plurality of initial particles may be set to ensure that a Gaussian search density may cover all directions and translations tightly enough.

A standard deviation with respect to an initial video frame may be expressed by Equation 2.

$$\sigma_x = \frac{w_{init}}{7}; \sigma_y = \frac{h_{init}}{7};$$
$$\sigma_{\bar{x}} = \frac{w_{init}}{2}; \sigma_{\bar{y}} = \frac{h_{init}}{2};$$
$$\sigma_w = \frac{w_{init}}{20}; \sigma_h = \frac{h_{init}}{20}$$ [Equation 2]

In Equation 2, $\sigma_x$ denotes a standard deviation with respect to a coordinate x of the bounding box of the initial video frame, $\sigma_y$ denotes a standard deviation with respect to a coordinate y of the bounding box of the initial video frame, $\sigma w$ denotes a standard deviation with respect to a width of the bounding box of the initial video frame, $\sigma h$, denotes a standard deviation with respect to a height of the bounding box of the initial video frame, $\sigma_{\bar{x}}$ denotes a standard deviation with respect to an x-direction motion vector of the bounding box of the initial video frame, $\sigma_{\bar{y}}$ denotes a standard deviation with respect to a y-direction motion vector of the bounding box of the initial video frame, $w_{init}$ denotes a Ground Truth width of the initial video frame, and $h_{init}$ denotes the height of the bounding box of the initial video frame.

The Gaussian distribution vector of the standard deviation may be expressed by Equation 3.

$$(\sigma_x; \sigma_y; \sigma_w; \sigma_h) = \left(\frac{w}{2}; \frac{h}{2}; 0.05; 0.05\right)$$ [Equation 3]

In a case in which the video frame is not an initial video frame, the particle filter 231 may generate the plurality of initial particles by resampling a plurality of candidate particles corresponding to an object in a previous video frame of the video frame.

In detail, the particle filter 231 may remove at least one candidate particle with a relatively low weight from the plurality of candidate particles corresponding to the object in the previous video frame.

For example, the at least one candidate particle with the relatively low weight may be at least one unreliable particle.

The particle filter 231 may generate a plurality of replacement particles corresponding to the object in the video frame initialized with random values based on a number of the at least one candidate particle. The plurality of replacement particles may be marked with a bounding box.

For example, the particle filter 231 may generate the plurality of replacement particles initialized with the random values based on the number of the at least one candidate particle using a normal distribution with standard deviations. The particle filter 231 may maintain a trade-off between particles by generating the plurality of replacement particles and reduce an amount of computation for particle generation.

The particle filter 231 may determine a plurality of unremoved candidate particles of the previous video frame and the plurality of replacement particles to be the plurality of initial particles.

The particle filter 231 may generate the plurality of candidate particles by predicting motions of the plurality of initial particles through at least one of drift and diffuse of the plurality of initial particles.

For example, the particle filter 231 may generate a plurality of candidate particles corresponding to an object in a video frame as shown in FIG. 5. In FIG. 5, a result of a first video frame (RESULT 1) may be an initial video frame, a result of a second video frame (RESULT 2) may be a sixth video frame, a result of a third video frame (RESULT 3) may be a twenty-first video frame, and a result of a fourth video frame (RESULT 4) may be a forty-first video frame.

The drift may be performed by varying a motion vector component for the plurality of initial particles. For example, the drift may be performed by varying the motion vector component for the plurality of initial particles with predetermined noise.

The diffuse may be performed by varying coordinates of a bounding box for the plurality of initial particles. For example, the diffuse may be performed by varying the coordinates of the bounding box for the plurality of initial particles with the predetermined noise.

Standard deviations of the predetermined noise with respect to the drift and the diffuse may be expressed by Equation 4.

$$\left[\frac{w}{20}; \frac{h}{20}; \frac{w}{20}; \frac{h}{20}; \frac{w}{20}; \frac{h}{20};\right]$$ [Equation 4]

Equation 4 may be $\{.\sigma_x, \sigma_y, \sigma_{\bar{x}}, \sigma_{\bar{y}}, \sigma_w, \sigma_h\}$.

The tracker 233 may calculate similarities of the plurality of candidate particles with respect to the object in the video frame using a pre-trained CNN model.

For example, the tracker 233 may calculate the similarities using a forward pass of the pre-trained CNN model. The pre-trained CNN model may be a model in which a network is set to a state close to a local minimum value to recognize a high-level feature of the object in the video frame.

The pre-trained CNN model may include a single input network (INPUT) and five layers (LAYER 1 through LAYER 5) as shown in FIG. 4.

The first layer (LAYER 1) through the third layer (LAYER 3) may be convolutional layers initialized with a value of a convolutional neural network particle filter (CNN-PF) network. A dimension of the first layer (LAYER 1) as a first convolutional layer may be 7×7, a dimension of the second layer (LAYER 2) as a second convolutional layer may be 5×5, and a dimension of the third layer (LAYER 3) as a third convolutional layer may be 3×3. The first layer (LAYER 1) through the third layer (LAYER 3) may be pre-trained through a video dataset, thereby reducing an offline training time greatly.

The fourth layer (LAYER 4) and the fifth layer (LAYER 5) may be layers designed to classify the video frame into an object and a background based on the high-level feature of the object in the video frame calculated in the first layer (LAYER 1) through the third layer (LAYER 3). The fourth layer (LAYER 4) and the fifth layer (LAYER 5) may be fully connected layers. Dimensions of the fourth layer (LAYER 4) and the fifth layer (LAYER 5) may be 256.

The pre-trained CNN model may be trained using at least one of training through a video dataset and training through a most recently tracked video frame.

The training through the video dataset may be offline training through a positive patch with respect to an object in the video dataset and a negative patch with respect to a background in the video dataset. For example, the video dataset may be a VOT2015 video dataset including 60 video sequences, with each sequence accompanied by a bounding box for the object in the video frame. The positive patch with respect to the object in the video dataset may be 256 positive patches extracted from the video dataset. The negative patch with respect to the background in the video dataset may be 64 negative patches extracted from the video dataset.

The training through the most recently tracked video frame may be online training through a positive patch with respect to an object in the most recently tracked video frame and a negative patch with respect to a background in the most recently tracked video frame. For example, the positive patch with respect to the object in the most recently tracked video frame may be 32 positive patches extracted from the most recently tracked video frame. The negative patch with respect to the background in the most recently tracked video frame may be 128 negative patches extracted from the most recently tracked video frame.

The positive patch may be a ground-truth patch with respect to the object in the video frame and include geometric transformations such as at least one of translation, scaling and affine transformation of the object in the video frame. An overlap of the positive patch with the bounding box for the object in the video frame may be higher than or equal to 90%.

The negative patch may be a ground-truth patch with respect to the background in the video frame. An overlap of the negative patch with the bounding box for the object in the video frame may be lower than or equal to 40%.

The tracker 233 may determine weights of the plurality of candidate particles based on the similarities.

For example, the tracker 233 may determine a relatively high weight for a candidate particle with a relatively high similarity among the plurality of candidate particles.

The candidate particle with the relatively high similarity may be a particle having a relatively high overlap with the object in the video frame. The candidate particle with the relatively high similarity may not be a candidate particle from a plurality of candidate particles corresponding to an object in an old previous video frame.

The weights of the plurality of candidate particles may be expressed by Equation 5.

$$\bar{w}_i = e^{-4.0*(1-z_i)}$$ [Equation 5]
$$w_i = \frac{\bar{w}_i}{\sum_{k=1}^{N} \bar{w}_k}$$

In Equation 5, $z_i$ denotes a CNN measured score, and $w_i$ denotes a weight of an i-th candidate particle among the plurality of candidate particles. The first equation of Equation 5 may be an example of calculating a weight of an unnormalized i-th candidate particle. The second equation of Equation 5 may be an example of performing a normalization.

The tracker 233 may track the object in the video frame by generating the optimal particles at a mean position of candidate particles with relatively high weights among the plurality of candidate particles.

For example, the tracker 233 may recognize positions of the candidate particles with the relatively high weights among the plurality of candidate particles.

The tracker 233 may generate a single particle at the mean position of the positions of the candidate particles with the relatively high weights.

The tracker 233 may track the object in the video frame by determining the generated single particle to be an optimal particle corresponding to the position of the object in the video frame.

The tracker 233 may mark the optimal particle with a bounding box. For example, the tracker 233 may mark the optimal particle with the bounding box as shown in FIG. 5. The bounding box for the optimal particle may be a ground-truth bounding box.

The tracker 233 may update the pre-trained CNN model through the tracked object. For example, the tracker 233 may update the pre-trained CNN model by fine-tuning through the positive patch with respect to the object in the tracked video frame and the negative patch with respect to the background in the tracked video frame.

In a case in which the tracked video frame is an initial video frame, the positive patch with respect to the object in the tracked video frame may be 128 positive patches extracted from the tracked video frame. The negative patch with respect to the background in the tracked video frame may be 512 negative patches extracted from the tracked video frame.

In a case in which the tracked video frame is not an initial video frame, a number of positive patches with respect to the object in the tracked video frame and a number of negative patches with respect to the background in the tracked video frame may be equal to a number of positive patches with respect to the object in the most recently tracked video frame and a number of negative patches with respect to the background in the most recently tracked video frame.

The display 250 may display the video received from the controller 230. For example, the display 250 may display the video in which the object in the plurality of video frames received from the controller 230 is marked with the bounding box.

As described above, the display 250 may be implemented in the object tracking apparatus 200 to display the video received from the controller 230. However, embodiments are not limited thereto. The display 250 may be implemented independently of the object tracking apparatus 200 to display the video received from the controller 230.

Figure 6:
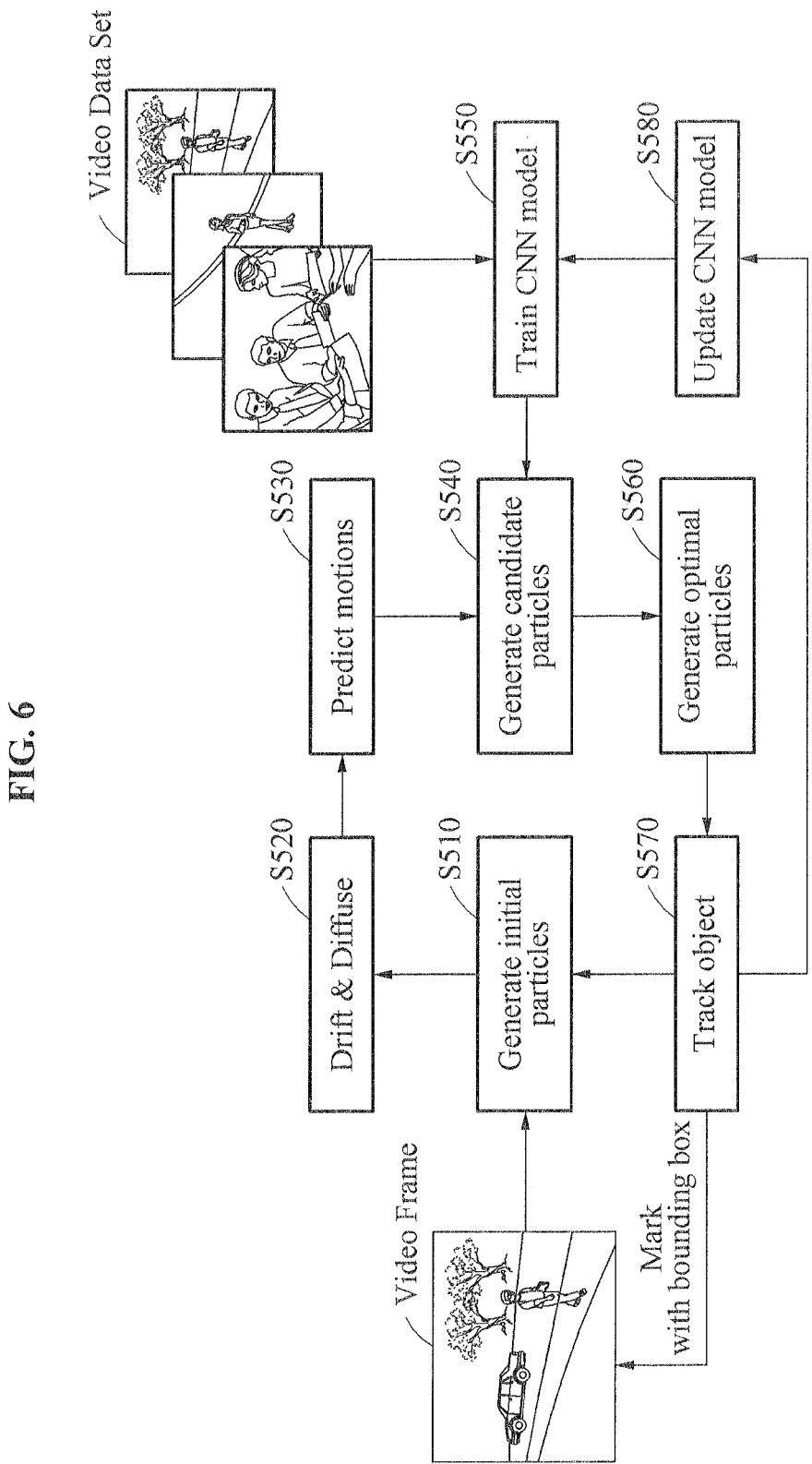
FIG. 6 is a flowchart illustrating an operation of the object tracking apparatus of FIG. 1.

FIG. 6 is a flowchart illustrating an operation of the object tracking apparatus of FIG. 1.

Referring to FIG. 6, the particle filter 231 may generate a plurality of initial particles corresponding to an object in a video frame based on the video frame (S310).

The particle filter 231 may predict, through at least one of drift and diffuse of the plurality of initial particles (S320), motions of the plurality of initial particles (S330), thereby generating a plurality of candidate particles corresponding to the object in the video frame (S340).

The tracker 233 may generate, through a pre-trained CNN model (S550), optimal particles corresponding to a position of the object in the video frame based on similarities of the plurality of candidate particles with respect to the object in the video frame (S560), thereby tracking the object in the video frame (S570).

The tracker 233 may mark the tracked object with a bounding box and update the pre-trained CNN model through the tracked object (S580).

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. An object tracking method, comprising:
generating a plurality of initial particles corresponding to an object in a video frame based on whether the video frame is an initial video frame;
generating a plurality of candidate particles corresponding to the object to track the object of the video frame by predicting motions of the plurality of initial particles; and
tracking the object by generating optimal particles corresponding to a position of the object in the video frame based on similarities of the plurality of candidate particles with respect to the object, and
wherein the generating a plurality of initial particles comprises:
removing at least one candidate particle with a relatively low weight from a plurality of candidate particles corresponding to the object in a previous video frame of the video frame, in a case in which the video frame is not an initial video frame;
generating a plurality of replacement particles corresponding to the object in the video frame initialized with random values based on a number of the at least one candidate particle; and
determining a plurality of unremoved candidate particles of the previous video frame and the plurality of replacement particles to be the plurality of initial particles.

2. The object tracking method of claim 1, wherein the generating a plurality of candidate particles comprises:
generating the plurality of candidate particles by predicting motions of the plurality of initial particles through at least one of drift and diffuse of the plurality of initial particles.

3. The object tracking method of claim 2, wherein the drift is performed by varying a motion vector component for the plurality of initial particles, and
the diffuse is performed by varying coordinates of a bounding box for the plurality of initial particles.

4. The object tracking method of claim 1, wherein the generating of the plurality of initial particles comprises generating the plurality of initial particles initialized with random values using the Gaussian distribution, in a case in which the video frame is an initial video frame.

5. The object tracking method of claim 1, wherein the tracking comprises:
calculating the similarities of the plurality of candidate particles with respect to the object using a pre-trained convolutional neural network (CNN) model;
determining weights of the plurality of candidate particles based on the similarities; and
tracking the object by generating the optimal particles at a mean position of candidate particles with relatively high weights among the plurality of candidate particles.

6. The object tracking method of claim 5, wherein the pre-trained CNN model is trained using at least one of training through a video dataset and training through a most recently tracked video frame.

7. The object tracking method of claim 6, wherein the training through the video dataset is training through a positive patch with respect to an object in the video dataset and a negative patch with respect to a background in the video dataset, and
the training through the most recently tracked video frame is training through a positive patch with respect to an object in the most recently tracked video frame and a negative patch with respect to a background in the most recently tracked video frame.

8. The object tracking method of claim 5, wherein the tracking further comprises:
updating the pre-trained CNN model through the tracked object.

9. An object tracking apparatus, comprising:
a communication module configured to receive a video frame; and
a controller configured to generate a plurality of initial particles corresponding to an object in a video frame based on whether the video frame is an initial video frame, and generate a plurality of candidate particles corresponding to the object to track the object of the video frame by predicting motions of the plurality of initial particles, and track the object by generating optimal particles corresponding to a position of the object in the video frame based on similarities of the plurality of candidate particles with respect to the object, and
wherein the controller is configured to remove at least one candidate particle with a relatively low weight from a plurality of candidate particles corresponding to the object in a previous video frame of the video frame, in a case in which the video frame is not an initial video frame, and generate a plurality of replacement particles corresponding to the object in the video frame initialized with random values based on a number of the at least one candidate particle; and determine a plurality of unremoved candidate particles of the previous video frame and the plurality of replacement particles to be the plurality of initial particles.

10. The object tracking apparatus of claim 9, wherein the controller comprises:
a particle filter configured to generate the plurality of candidate particles by predicting motions of the plurality of initial particles through at least one of drift and diffuse of the plurality of initial particles.

11. The object tracking apparatus of claim 10, wherein the drift is performed by varying a motion vector component for the plurality of initial particles, and
the diffuse is performed by varying coordinates of a bounding box for the plurality of initial particles.

12. The object tracking apparatus of claim 9, wherein the controller is configured to generate the plurality of initial particles initialized with random values using the Gaussian distribution, in a case in which the video frame is an initial video frame.

13. The object tracking apparatus of claim 9, wherein the controller comprises:
a tracker configured to calculate the similarities of the plurality of candidate particles with respect to the object using a pre-trained convolutional neural network (CNN) model, determine weights of the plurality of candidate particles based on the similarities, and track the object by generating the optimal particles at a mean position of candidate particles with relatively high weights among the plurality of candidate particles.

14. The object tracking apparatus of claim 13, wherein the pre-trained CNN model is trained using at least one of training through a video dataset and training through a most recently tracked video frame.

15. The object tracking apparatus of claim 14, wherein the training through the video dataset is training through a positive patch with respect to an object in the video dataset and a negative patch with respect to a background in the video dataset, and the training through the most recently tracked video frame is training through a positive patch with respect to an object in the most recently tracked video frame and a negative patch with respect to a background in the most recently tracked video frame.

16. The object tracking apparatus of claim 13, wherein the tracker is configured to update the pre-trained CNN model through the tracked object.

\* \* \* \* \*